US012780555B2

(12) United States Patent
Takeno et al.

(10) Patent No.: US 12,780,555 B2
(45) Date of Patent: Nov. 3, 2026

(54) ARTICLE TRANSPORT FACILITY

(71) Applicant: Daifuku Co., Ltd., Osaka (JP)

(72) Inventors: Keisuke Takeno, Komaki (JP); Makoto Kono, Komaki (JP); Kazuhiro Iwamitsu, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 29 days.

(21) Appl. No.: 19/203,288

(22) Filed: May 9, 2025

(65) Prior Publication Data

US 2025/0346431 A1 Nov. 13, 2025

(30) Foreign Application Priority Data

May 10, 2024 (JP) ................................ 2024-077485

(51) Int. Cl.
*B65G 17/12* (2006.01)
*H10P 72/30* (2026.01)

(52) U.S. Cl.
CPC .................................. *B65G 17/12* (2013.01)

(58) Field of Classification Search
None
See application file for complete search history.

(56) References Cited

U.S. PATENT DOCUMENTS 7,958,987 B2 * 6/2011 Monti .................... B65B 57/16 198/465.2
9,086,697 B2 * 7/2015 Suzuki ............ G05B 19/41895
10,526,146 B1 * 1/2020 Resnick ................ B65G 47/52
10,734,267 B2 * 8/2020 Motoori .................. B65G 1/00
11,312,578 B2 * 4/2022 Kono ........................ B61B 3/02
2002/0179502 A1 * 12/2002 Cerutti .................. B65G 43/08 209/583
2009/0065330 A1 * 3/2009 Lupton ............... B65G 47/684 700/223
2017/0283182 A1 * 10/2017 Maejima ............... B65G 35/08
2021/0362949 A1 * 11/2021 Morimoto ................ B61B 3/02
2022/0340370 A1 * 10/2022 Kono ..................... B65G 43/08
2022/0348410 A1 * 11/2022 Kono .................. B65G 1/1373
2022/0384229 A1 * 12/2022 Kitamura ............ B65G 1/0457
(Continued)

FOREIGN PATENT DOCUMENTS

JP 2004075254 A * 3/2004
JP 2019125275 A * 7/2019
WO WO-2023132101 A1 * 7/2023 .......... H10P 72/3218

*Primary Examiner* — Gene O Crawford
*Assistant Examiner* — Muhammad Awais
(74) *Attorney, Agent, or Firm* — The Webb Law Firm

(57) ABSTRACT

An article transport facility includes a control system that issues a transport command specifying a transport origin and a transport destination of an article to a transport vehicle. The control system is configured to execute predicted transport time derivation processing for deriving a predicted transport time for each of a plurality of candidate paths, and path selection processing for selecting a transport path for the transport vehicle to travel along from among the plurality of candidate paths. The control system preferentially selects a candidate path whose predicted transport time is within a reference range as the transport path in path selection processing regarding the candidate paths with a target transport destination as the transport destination.

4 Claims, 4 Drawing Sheets

(56) References Cited

U.S. PATENT DOCUMENTS

| | | | | |
|---|---|---|---|---|
| 2023/0227267 | A1 * | 7/2023 | Kiyokawa .............. | B65G 43/00 198/357 |
| 2023/0339681 | A1 * | 10/2023 | Stadie .................... | A01G 31/06 |
| 2025/0083710 | A1 | 3/2025 | Harasaki | |

* cited by examiner

Fig.6

Tp

| PATH | PREDICTED TRANSPORT TIME | RANGE |
|---|---|---|
| CANDIDATE PATH A | 60 | OUTSIDE REFERENCE RANGE |
| CANDIDATE PATH B | 15 | OUTSIDE REFERENCE RANGE |
| CANDIDATE PATH C | 25 | WITHIN REFERENCE RANGE |

90

Rt

| REFERENCE RANGE |
|---|
| 25～35 |

Fig.7

Tp

X

※CORRECTION VALUE: 35

| PATH | PREDICTED TRANSPORT TIME | AFTER CORRECTION |
|---|---|---|
| CANDIDATE PATH A | 60 → | 95 |
| CANDIDATE PATH B | 15 → | 50 |
| CANDIDATE PATH C | 25 | 25 |

92(90)

91(90)

Rt

| REFERENCE RANGE |
|---|
| 25～35 |

Fig.8

Tp

| PATH | PREDICTED TRANSPORT TIME | DEVIATION |
|---|---|---|
| CANDIDATE PATH A | 40 | +5 |
| CANDIDATE PATH B | 45 | +10 |
| CANDIDATE PATH C | 10 | −15 |

90

Rt

| REFERENCE RANGE |
|---|
| 25～35 |

ARTICLE TRANSPORT FACILITY

CROSS-REFERENCE TO RELATED APPLICATION

This application claims priority to Japanese Patent Application No. 2024-077485 filed May 10, 2024, the disclosure of which is hereby incorporated by reference in its entirety.

BACKGROUND OF THE INVENTION

1. Field of the Invention

The present invention relates to an article transport facility that includes: predetermined paths; a plurality of transport vehicles that travel along the paths to transport articles; a plurality of transfer stations located along the paths; and a control system that issues a transport command specifying a transport origin and a transport destination of an article to each of the transport vehicles.

2. Description of Related Art

For example, WO 2023/132101 discloses a technology for selecting, as a movement path of a transport vehicle, a path with the lowest cost from among a plurality of paths from a transport origin to a transport destination of an article.

The cost of a path is often set based on the time required for the transport vehicle to travel along the path to transport the article. Ordinarily, the cost of a path decreases as the time required for transport decreases.

SUMMARY OF THE INVENTION

In article transport facilities, a plurality of transport vehicles transport articles in accordance with their respective tasks. However, if all the transport vehicles select a path with the lowest possible cost, it is possible that a plurality of transport vehicles will concentrate on a particular path, such as a main path near the center of the facility. In this case, the degree of congestion on the particular path increases, causing the transport vehicles traveling along this path to require more time for article transport despite selecting a low-cost path. This may result in lower transport efficiency for the entire facility.

In view of the foregoing circumstances, it is desirable to realize a technology capable of suppressing a decrease in transport efficiency for the entire facility.

The following is a technology for solving the above problems.

An article transport facility includes:

a plurality of predetermined paths;

a plurality of transport vehicles configured to travel along the paths and transport articles;

a plurality of transfer stations located along the paths; and a control system configured to issue a transport command specifying a transport origin and a transport destination of an article to each of the transport vehicles.

Each of the transport origin and the transport destination specified is one of the plurality of transfer stations, the control system is configured to execute:

predicted transport time derivation processing for deriving a predicted transport time that is a predicted value of a time required to transport the article by traveling along a candidate path, for each of a plurality of candidate paths each of which is a candidate for a transport path for the corresponding transport vehicle to transport the article from the transport origin to the transport destination; and path selection processing for selecting the transport path for the transport vehicle to travel along from among the plurality of candidate paths, a time range including an average transport time is set as a reference range, the average transport time being an average of required transport times for a combination of a plurality of transport origins with respect to a target transport destination, each of the required transport times being a time required to transport the article along a path from one of the plurality of transport origins to one target transport destination, the target transport destination being a transport destination to be a target out of a plurality of transport destinations specifiable in the transport command, and the control system preferentially selects a candidate path whose predicted transport time is within the reference range as the transport path in the path selection processing regarding candidate paths with the target transport destination as the transport destination.

According to this configuration, the control system preferentially selects the candidate path whose predicted transport time is within the reference range as the transport path for each of the transport vehicles. This causes each of the plurality of transport vehicles operating in the facility to travel along the transport path selected for itself and transport the article in a time close to the average transport time. As a result, the required transport time for each transport vehicle is equalized throughout the facility, and the decrease in the transport efficiency for the entire facility can be suppressed.

Further features and advantages of the technology according to the present disclosure will be further clarified by the following description of a non-limiting illustrative embodiment with reference to the drawings.

BRIEF DESCRIPTION OF THE DRAWINGS

FIG. 6 shows predicted transport time of each transport path.

FIG. 7 shows corrected predicted transport time of each transport path.

FIG. 8 shows a deviation of the predicted transport time of each transport path.

DESCRIPTION OF THE INVENTION

The following describes an embodiment of an article transport facility with reference to the drawings.

Figure 1:
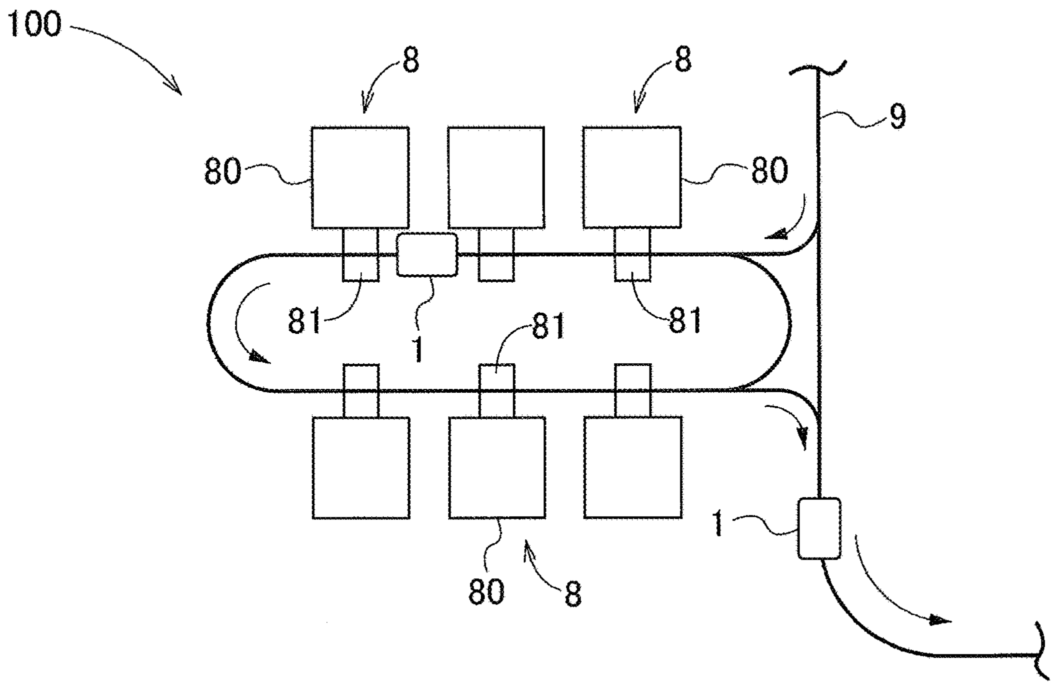
FIG. 1 is a plan view showing a portion of an article transport facility.

FIG. 1 is a plan view showing a portion of an article transport facility 100. As shown in FIG. 1, the article transport facility 100 includes predetermined paths 9, a plurality of transport vehicles 1 that travel along the paths 9 to transport articles (not shown), a plurality of transfer stations 8 located along the paths 9, and a control system 2 (see FIG. 2) that controls the transport vehicles 1 on the paths 9.

The paths 9 in this embodiment are constituted by rails. For example, the rails constituting the paths 9 are installed near the ceiling of the facility. In this case, each transport vehicle 1 is configured as a so-called overhead transport vehicle that travels along the paths 9 installed near the ceiling.

Various articles can be handled in the article transport facility 100. For example, the article transport facility 100 may be used in a semiconductor manufacturing plant. Thus, examples of the articles include substrate containers (so-called FOUPs: Front Opening Unified Pods) for containing substrates (wafers, panels etc.), reticle containers (so-called reticle pods) for containing reticles, magazines, and trays. In this case, the transport vehicles 1 transport articles such as substrate containers or reticle containers along the paths 9 between processes.

The transfer stations 8 are stations to which each transport vehicle 1 delivers articles or from which the transport vehicle 1 receives articles. Each transfer station 8 in this embodiment includes a processing device 80 that performs processing for the articles, and a placement table 81 disposed adjacent to the processing device 80. The "processing for the articles" means processing for an object (substrate, reticle etc.) contained in each article as a container. The transport vehicle 1 receives an article after being processed by the processing device 80 from the placement table 81, or delivers an article that has not been processed by the processing device 80 to the placement table 81. Note that the processing device 80 performs various processing, such as thin film formation, photolithography, and etching. Not limited to the above, examples of the transfer station 8 may also include a buffer for temporarily storing articles midway on the paths 9, as well as an inlet port and an outlet port arranged adjacent to an automated warehouse for storing the articles.

Figure 2:
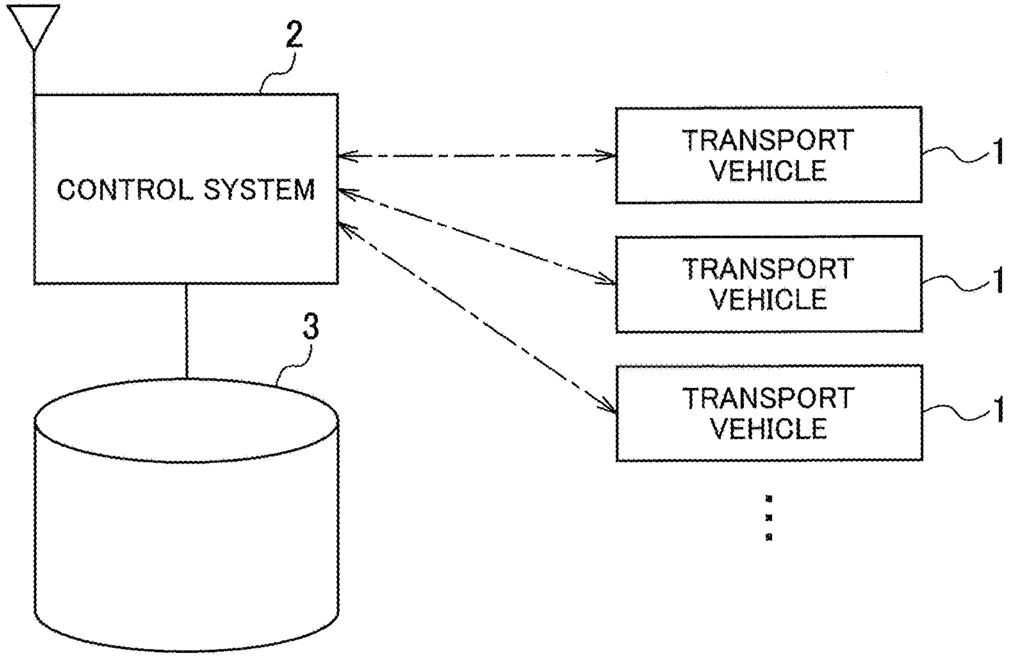
FIG. 2 is a control block diagram.

As shown in FIG. 2, the control system 2 is capable of communicating with each transport vehicle 1. The control system 2 issues a transport command specifying a transport origin F and a transport destination T (see FIG. 5) to the transport vehicle 1. Each of the transport origin F and the transport destination T specified is any of the plurality of transfer stations 8.

The control system 2 in this embodiment issues a transport command to each transport vehicle 1 based on a preset article production schedule. The control system 2 in the illustrated example is capable of obtaining various information from a database 3. The aforementioned production schedule is stored in the database 3. The control system 2 obtains the production schedule from the database 3 and issues a transport command to each transport vehicle 1.

The control system 2 includes a storage device for storing information input to an input device, an arithmetic processing device that performs arithmetic processing by reading information from the storage device and stores the results of the processing in the storage device, and a control device that issues commands to these devices. The control system 2 includes one or more CPUs. These CPUs are elements included in a stationary control device installed in the facility or a control device installed in each transport vehicle 1.

Figure 5:
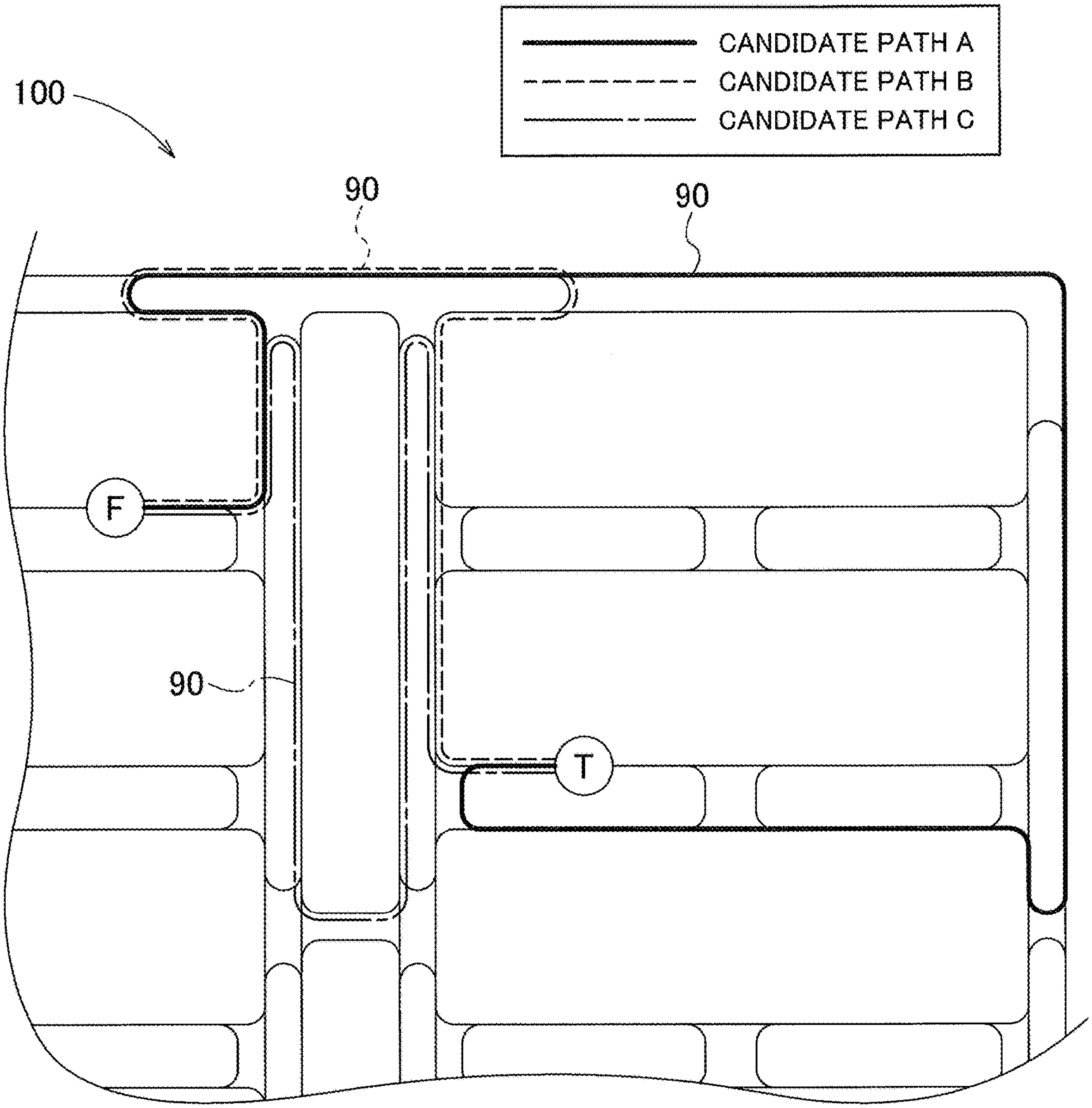
FIG. 5 shows candidate paths from a specific transport origin to a target transport destination.

Here, the transport vehicle 1 that has received the transport command transports the article from the transport origin F to the transport destination T, while there are a plurality of paths 9 from the transport origin F to the transport destination T (see FIG. 5).

The control system 2 is configured to execute path selection processing for selecting a transport path 9 for the transport vehicle 1 to travel along from among a plurality of candidate paths 90, which are candidates for the transport path 9 for the transport vehicle 1 to transport the article from the transport origin F to the transport destination T. The transport vehicle 1 transports the article from the transport origin F to the transport destination T by traveling along the transport path 9 selected by the path selection processing of the control system 2.

Before selecting the transport path 9 from among the plurality of candidate paths 90, the control system 2 derives an index serving as a reference for selection for each of the candidate paths 90. Here, the control system 2 is configured to execute, for each of the candidate paths 90, predicted transport time derivation processing for deriving a predicted transport time Tp (see FIG. 5), which is a predicted value of the time required to transport an article by traveling along the candidate path 90. The control system 2 executes the path selection processing based on the predicted transport time Tp derived by the predicted transport time derivation processing.

The control system 2 in this embodiment calculates costs for each candidate path 90 and derives the predicted transport time Tp based on the costs. The costs include a fixed cost and a variable cost. The fixed cost is set based on, for example, the length and structure of the transport path 9 or the environment surrounding the transport path 9, such as the presence or absence of stations (transfer stations 8). The variable cost is determined, for example, based on the degree of congestion, the presence or absence of a failed vehicle, or the like.

Thus, the control system 2 derives the predicted transport time Tp for each candidate path 90 by executing the predicted transport time derivation processing. The control system 2 then executes the path selection processing based on the predicted transport time Tp of each candidate path 90 to select the transport path 9 for the transport vehicle 1 to travel along from among the plurality of candidate paths 90.

Typically, in order to improve the transport efficiency for the entire facility, a candidate path 90 having the shortest predicted transport time Tp among the plurality of candidate paths 90 is often selected as the transport path 9. However, the path selection according to such a rule does not necessarily contribute to the improvement of the transport efficiency. This is because if the candidate path 90 having the shortest predicted transport time Tp is selected for all the transport vehicles 1, the transport vehicles 1 will concentrate on the particular path 9, and the transport will require more time due to congestion.

The article transport facility 100 according to the present disclosure equalizes the time for the transport vehicles 1 to transport the articles, thereby suppressing a decrease in the transport efficiency for the entire facility. Details are described below.

Figure 3:
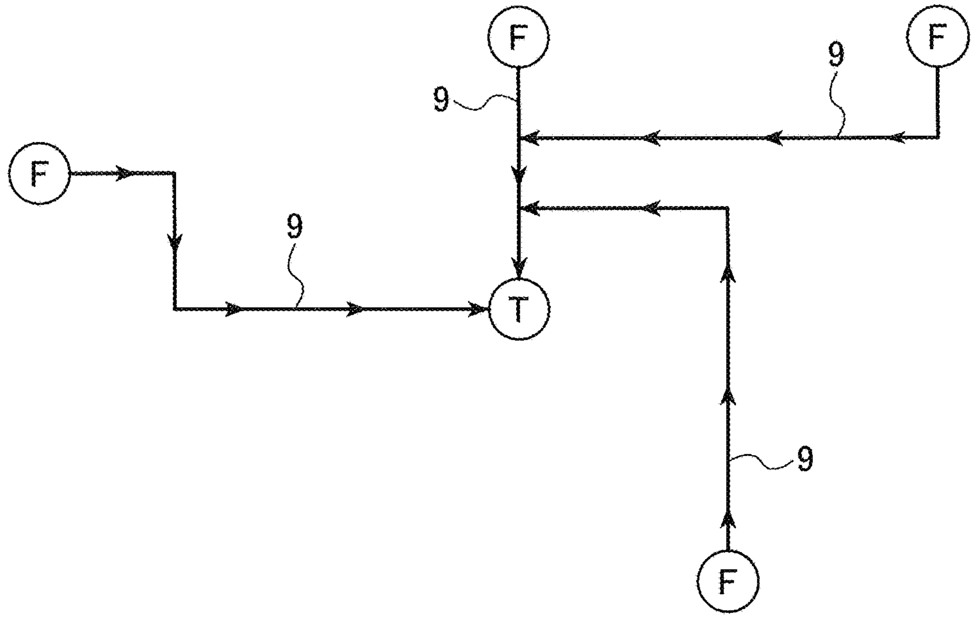
FIG. 3 shows paths from a plurality of transport origins to a target transport destination.

A "target transport destination T" refers to a transport destination T as a target among the plurality of transport destinations T that can be specified in the transport command issued by the control system 2, as shown in FIG. 3. A "required transport time Tr" (see FIG. 4) refers to the time required to transport the article through the path 9 from each of the plurality of transport origins F to one target transport destination T.

When the entire paths 9 are considered, there may be a plurality of transport origins F (transfer stations 8) for one target transport destination T (transfer station 8). In other words, one transfer station 8 (target transport destination T) can be a destination for performing the next processing on articles that have been processed at the transfer stations 8 (transport origins F) located at different positions on the paths 9. If the transport origin F is different, the required transport time Tr to the target transport destination T varies depending on the path 9.

Figure 4:
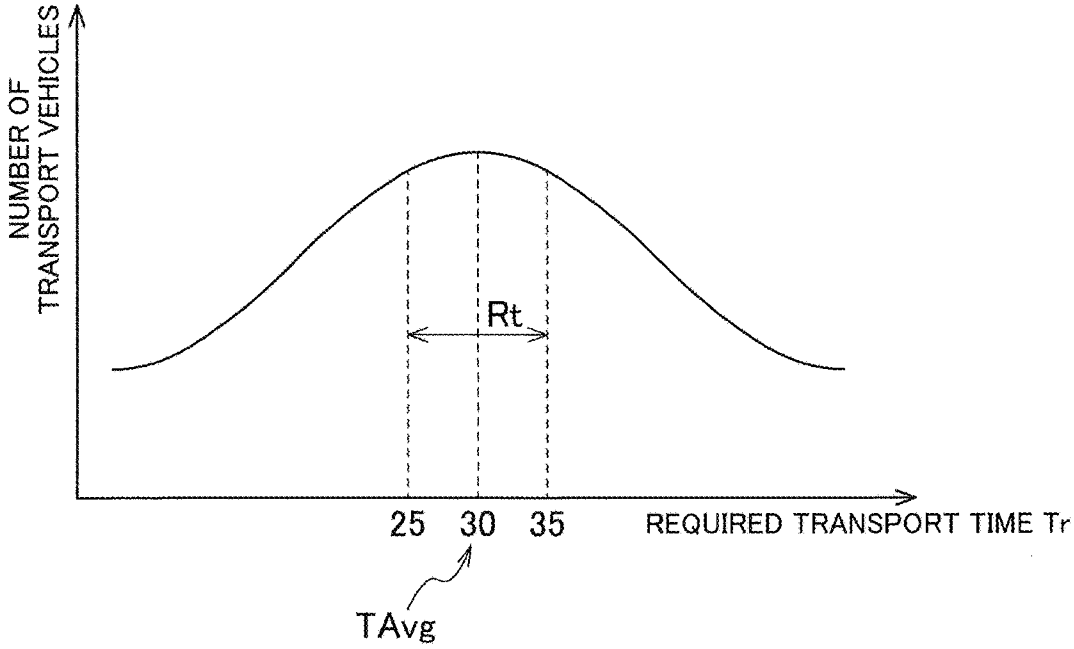
FIG. 4 shows a distribution of required transport time of each path.

FIG. 4 shows a distribution of the required transport time Tr from each of the possible number of transport origins F to one target transport destination T. An average time required to transport the article to the target transport destination T in the article transport facility 100 is obtained by calculating an average value of all required transport times Tr. Here, an "average transport time TAvg" refers to an average of the required transport times Tr for a combination of the plurality of transport origins F with respect to the target transport destination T. In the illustrated example, the average transport time TAvg is 30 seconds. The average transport time TAvg may be calculated with reference to all the transfer stations 8 (transport origins F) provided in the article transport facility 100 with respect to the target transport destination T, or with reference to any of the transfer stations 8 (transport origins F).

The transport destination T is the transfer station 8 where the processing device 80 is installed, as mentioned above. The plurality of processing devices 80 installed in the article transport facility 100 perform different processing on the articles and have different processing times. A production schedule is determined for each processing device 80 (transport destination T) in accordance with the processing content and processing time. It is also effective to set the production schedule in accordance with the average transport time TAvg calculated for each processing device 80 (transport destination T).

In this embodiment, past actual values are used as the required transport times Tr for the combination of the plurality of transport origins F for the target transport destination T. These values are stored in, for example, the database 3 (see FIG. 2). However, the control system 2 may alternatively calculate the required transport time Tr to the target transport destination T for each of the plurality of paths 9 based on the current state of the facility.

As a result of every transport vehicle 1 present in the article transport facility 100 transporting the article to the target transport destination T in the average transport time TAvg or a time close thereto, it is possible to equalize the required transport time Tr throughout the facility and to suppress a decrease in the transport efficiency. Thus, it is possible to suppress a decrease in the transport efficiency for the entire facility by selecting a candidate path 90 having the required transport time Tr equal to or close to the average transport time TAvg in the path selection processing.

However, the average transport time TAvg is a concept of a "point" that indicates a single point on the time axis. Therefore, if the average transport time TAvg is used as a processing criterion for the path selection processing, there may be few cases in which the processing criterion is satisfied.

In the article transport facility 100 according to the present disclosure, a time range including the average transport time TAvg is set as a reference range Rt. This allows for flexibility in the processing criteria for the path selection processing. The reference range Rt may be set as appropriate in accordance with the operating situation or the like of the facility, and may be set either by the control system 2 or the operator. In the example shown in FIG. 4, the reference range Rt is set to a range ±5 seconds of the average transport time TAvg. That is, the reference range Rt is the range from 25 to 35 seconds.

FIG. 5 shows three candidate paths 90 from a specific transport origin F to a target transport destination T. In the following, these candidate paths 90 are referred to as candidate paths A, B, and C, respectively. Of the three candidate paths 90 in the illustrated example, the candidate path A is the longest, the candidate path B is the shortest, and the candidate path C has a length between those of the candidate paths A and B.

As shown in FIG. 6, the control system 2 derives the predicted transport time Tp for each of the candidate paths A, B, and C by executing the predicted transport time derivation processing. In the illustrated example, the predicted transport time Tp of the candidate path A is 60 seconds, the predicted transport time Tp of the candidate path B is 15 seconds, and the predicted transport time Tp of the candidate path C is 25 seconds.

The control system 2 preferentially selects as the transport path 9 a candidate path 90 whose predicted transport time Tp is within the reference range Rt in the path selection processing for the candidate paths 90 with the target transport destination T as the transport destination T.

In the example shown in FIG. 6, the predicted transport time Tp of the candidate path A and the predicted transport time Tp of the candidate path B are outside the reference range Rt. Meanwhile, the predicted transport time Tp of the candidate path C is 25 seconds, which is within the reference range Rt. Accordingly, the control system 2 preferentially selects the candidate path C as the transport path 9 from the three candidate paths 90. That is, if only one candidate path 90 has a predicted transport time Tp within the reference range Rt in the path selection processing, the control system 2 selects this candidate path 90 as the transport path 9.

In the above example, only the predicted transport time Tp of the candidate path C is within the reference range Rt. However, there are cases where the predicted transport time Tp of more than one candidate path 90 is within the reference range Rt, depending on the relationship between the transport origin F and the target transport destination T. If more than one candidate path 90 has a predicted transport time Tp within the reference range Rt in the path selection processing, the control system 2 selects as the transport path 9 a candidate path 90 having the shortest predicted transport time Tp among them (not shown in detail in the figures). This makes it possible to reduce the required transport time Tr while promoting the equalization of the required transport time Tr for each transport vehicle 1.

Further, the control system 2 in this embodiment is configured to correct the predicted transport time Tp of each candidate path 90 by performing correction processing such that a candidate path 90 whose predicted transport time Tp is within or close to the reference range Rt is more likely to be selected as the transport path 9 for the transport vehicle 1 to travel along.

FIG. 7 shows a case where the control system 2 performs the aforementioned correction processing. Prerequisites in FIG. 7 are the same as those in FIG. 6, where the predicted transport time Tp of the candidate path A is 60 seconds, the predicted transport time Tp of the candidate path B is 15 seconds, and the predicted transport time Tp of the candidate path C is 25 seconds.

Of the plurality of candidate paths 90, a candidate path 90 whose predicted transport time Tp is within the reference range Rt is set as a priority candidate path 91, and a candidate path 90 whose predicted transport time Tp is outside the reference range Rt is set as a non-priority candidate path 92, as shown in FIG. 7. In the example shown in FIG. 7, the candidate path C is the priority candidate path 91, and the candidate paths A and B are the non-priority candidate paths 92.

The control system 2 executes the correction processing to correct the predicted transport time Tp of at least either the non-priority candidate paths 92 or the priority candidate path 91 such that the priority candidate path 91 is more likely to be selected than the non-priority candidate paths 92 in the path selection processing. In the correction processing in this example, the control system 2 corrects the predicted transport times Tp of the non-priority candidate paths 92, and does not correct the predicted transport time Tp of the priority candidate path 91. Then, in the path selection processing, the control system 2 selects as the transport path 9 a candidate path 90 having the shortest predicted transport time Tp after correction by the correction processing from the plurality of candidate paths 90.

In the correction processing in this embodiment, the control system 2 adds a correction value X to the predicted transport time Tp of each of the non-priority candidate paths 92. The correction value X may be a fixed value or a variable value. The variable value is set based on, for example, the number of transport vehicles 1 existing in the path 9, the number of transport vehicles 1 scheduled to pass through the path 9, or the like. The correction value X in this example is a fixed value and is set to the upper limit value of the reference range Rt (here, "35 seconds"). This makes the predicted transport time Tp of each non-priority candidate path 92 after correction always exceed the reference range Rt. Thus, the predicted transport time Tp of the non-priority candidate path 92 is adjusted to be a long time exceeding the reference range Rt, and is therefore unlikely to be selected in the path selection processing in which a candidate path 90 having the shortest predicted transport time Tp after correction is selected as the transport path 9.

In the example shown in FIG. 7, the upper limit value of the reference range Rt is 35 seconds, so the correction value X is 35 seconds. Thus, the predicted transport time Tp of the candidate path A after correction is 95 seconds, and the predicted transport time Tp of the candidate path B after correction is 50 seconds. The predicted transport time Tp of the candidate path C is not corrected and remains 25 seconds, as mentioned above. Alternatively, the correction processing may be performed in which the correction value X is set to 0 seconds for the candidate path C that is the priority candidate path 91, and 0 seconds is added to the predicted transport time Tp of the candidate path C. The control system 2 selects, from among those candidate paths, the candidate path C having the shortest predicted transport time Tp as the transport path 9.

FIG. 8 shows a case where there is no candidate path 90 whose predicted transport time Tp is within the reference range Rt. In the example shown in FIG. 8, unlike the situation shown in FIGS. 5 to 7, the predicted transport time Tp of the candidate path A is 40 seconds, the predicted transport time Tp of the candidate path B is 45 seconds, and the predicted transport time Tp of the candidate path C is 10 seconds. The predicted transport times Tp of all the candidate paths 90 are outside the reference range Rt from 25 seconds to 35 seconds.

In the path selection processing, if there is no candidate path 90 whose predicted transport time Tp is within the reference range Rt as shown in FIG. 8, the control system 2 selects a candidate path 90 whose predicted transport time Tp is closest to the reference range Rt as the transport path 9. The control system 2 in this example calculates a deviation between the predicted transport time Tp and the reference range Rt for each candidate path 90. That is, the extent to which the predicted transport time Tp deviates from the reference range Rt is calculated using a quantitative value. After calculating the deviation, the control system 2 compares the absolute values of the deviations for the candidate paths 90, and selects a candidate path 90 having the smallest absolute value of the deviation as the transport path 9. By comparing the absolute values of the deviations, the magnitudes of the values can be properly compared without considering the positive and negative signs.

In the example shown in FIG. 8, the deviation of the predicted transport time Tp of the candidate path A is +5 seconds, and the absolute value thereof is 5 seconds. This is the difference between the upper limit value of the reference range Rt, which is 35 seconds, and the predicted transport time Tp of the candidate path A, which is 40 seconds.

The deviation of the predicted transport time Tp of the candidate path B is +10 seconds, and the absolute value thereof is 10 seconds. This is the difference between the upper limit value of the reference range Rt, which is 35 seconds, and the predicted transport time Tp of the candidate path B, which is 45 seconds.

The deviation of the predicted transport time Tp of the candidate path C is −15 seconds, and the absolute value thereof is 15 seconds. This is the difference between the lower limit value of the reference range Rt, which is 25 seconds, and the predicted transport time Tp of the candidate path C, which is 10 seconds.

In the example shown in FIG. 8, the control system 2 selects as the transport path 9 the candidate path A having the smallest deviation of 5 seconds between the predicted transport time Tp and the reference range Rt.

With the above-described article transport facility 100, each of the plurality of transport vehicles 1 operating in the facility travels along the transport path 9 selected for itself and transports the article in a time close to the average transport time TAvg. As a result, the required transport time Tr for each transport vehicle 1 is equalized throughout the facility, and the decrease in the transport efficiency for the entire facility can be suppressed.

Other Embodiments

Next, the following describes other embodiments.

(1) The above embodiment has been described using an example where, in the correction processing, the control system 2 corrects the predicted transport time Tp of the non-priority candidate path 92, and does not correct the predicted transport time Tp of the priority candidate path 91. However, without being limited to this example, the control system 2 may correct both the predicted transport time Tp of the non-priority candidate path 92 and the predicted transport time Tp of the priority candidate path 91. Alternatively, the control system 2 may correct only the predicted transport time Tp of the priority candidate path 91. When correcting the predicted transport time Tp of the priority candidate path 91, the control system 2 may correct it to decrease the predicted transport time Tp. This makes the priority candidate path 91 more likely to be selected in the path selection processing when selecting the candidate path 90 having the smallest predicted transport time Tp as the transport path 9.

(2) The above embodiment has been described using an example where the control system 2 calculates the deviation of the predicted transport time Tp from the reference range Rt for each candidate path 90 and compares the magnitudes of the absolute values of the deviations. However, without being limited to this example, the control system 2 may compare squared values of the deviations for the candidate paths 90, or may compare square roots of those values. This makes it possible to remove the positive and negative signs from the values and appropriately compare their magnitudes.

(3) The above embodiment has been described using an example where, if, in the path selection processing, there is no candidate path 90 whose predicted transport time Tp is within the reference range Rt, the control system 2 selects as the transport path 9 a candidate path 90 whose predicted transport time Tp closest to the reference range Rt. However, without being limited to this example, the control system 2 may alternatively select as the transport path 9 a candidate path 90 whose predicted transport time Tp is closest to a certain value (e.g., average transport time TAvg) within the reference range Rt.

(4) The above embodiment has been described using an example where each transport vehicle 1 is configured as a so-called overhead transport vehicle. However, without being limited to this example, the transport vehicle 1 may alternatively be configured as a trackless vehicle, such as an AGV. In this case, each path 9 is configured using magnetic tape or the like provided on the floor surface.

(5) Note that the configurations disclosed in the above embodiment can also be applied in combination with the configurations disclosed in the other embodiments as long as no contradiction arises. As with the other configurations as well, the embodiments disclosed in the present specification are in all respects merely examples. Accordingly, it is possible to make various changes as appropriate without departing from the gist of the present disclosure.

Summary of Present Embodiment

The following describes a summary of the present embodiment.

An article transport facility includes:

a plurality of predetermined paths;

a plurality of transport vehicles configured to travel along the paths and transport articles;

a plurality of transfer stations located along the paths; and a control system configured to issue a transport command specifying a transport origin and a transport destination of an article to each of the transport vehicles.

Each of the transport origin and the transport destination specified is one of the plurality of transfer stations, the control system is configured to execute:

predicted transport time derivation processing for deriving a predicted transport time that is a predicted value of a time required to transport the article by traveling along a candidate path, for each of a plurality of candidate paths each of which is a candidate for a transport path for the corresponding transport vehicle to transport the article from the transport origin to the transport destination; and path selection processing for selecting the transport path for the transport vehicle to travel along from among the plurality of candidate paths, a time range including an average transport time is set as a reference range, the average transport time being an average of required transport times for a combination of a plurality of transport origins with respect to a target transport destination, each of the required transport times being a time required to transport the article along a path from one of the plurality of transport origins to one target transport destination, the target transport destination being a transport destination to be a target out of a plurality of transport destinations specifiable in the transport command, and the control system preferentially selects a candidate path whose predicted transport time is within the reference range as the transport path in the path selection processing regarding candidate paths with the target transport destination as the transport destination.

According to this configuration, the control system preferentially selects a candidate path whose predicted transport time is within the reference range as the transport path for the transport vehicle. This causes each of the plurality of transport vehicles operating in the facility to travel along the transport path selected for itself and transport the article in a time close to the average transport time. As a result, the required transport time for each transport vehicle is equalized throughout the facility, and the decrease in the transport efficiency for the entire facility can be suppressed.

It is preferable that the control system is further configured to:

execute correction processing for correcting the predicted transport time of at least either a non-priority candidate path or a priority candidate path such that the priority candidate path is more likely to be selected in the path selection processing than the non-priority candidate path, the priority candidate path being, of the plurality of candidate paths, a candidate path whose predicted transport time is within the reference range, the non-priority candidate path being a candidate path whose predicted transport time is outside the reference range; and select, in the path selection processing, a candidate path having a shortest predicted transport time after correction by the correction processing as the transport path from among the plurality of candidate paths.

According to this configuration, a candidate path whose predicted transport time is within or close to the reference range is more likely to be selected as the transport path for the transport vehicle to travel along. Therefore, the equalization of the required transport time for each transport vehicle is promoted, making it easier to suppress the decrease in the transport efficiency for the entire facility.

It is preferable that if, in the path selection processing, there are a plurality of the candidate paths whose predicted transport time is within the reference range, the control system selects a candidate path having a shortest predicted transport time as the transport path from among the plurality of candidate paths whose predicted transport time is within the reference range, and if, in the path selection processing, there is only one candidate path whose predicted transport time is within the reference range, the control system selects this candidate path as the transport path.

According to this configuration, it is possible to reduce the required transport time while promoting the equalization of the required transport time for each transport vehicle.

It is preferable that if, in the path selection processing, there is no candidate path whose predicted transport time is within the reference range, the control system selects a candidate path whose predicted transport time is closest to the reference range as the transport path.

According to this configuration, if there is no candidate path whose predicted transport time is within the reference range, a candidate path whose predicted transport time is closest to the reference range is selected as the transport path for the transport vehicle to travel along. This allows the required transport time to be equalized throughout the entire facility.

INDUSTRIAL APPLICABILITY

The technology according to the present disclosure can be utilized in an article transport facility that includes: predetermined paths; a plurality of transport vehicles that travel along the paths to transport articles; a plurality of transfer stations located along the paths; and a control system that issues a transport command specifying a transport origin and a transport destination of an article to each of the transport vehicles.

What is claimed is:

1. An article transport facility comprising:
a plurality of predetermined paths;
a plurality of transport vehicles configured to travel along the paths and transport articles;
a plurality of transfer stations located along the paths; and
a control system configured to issue a transport command specifying a transport origin and a transport destination of an article to each of the transport vehicles, and
wherein:
each of the transport origin and the transport destination specified is one of the plurality of transfer stations,
the control system is configured to execute:
predicted transport time derivation processing for deriving a predicted transport time that is a predicted value of a time required to transport the article by traveling along a candidate path, for each of a plurality of candidate paths each of which is a candidate for a transport path for the corresponding transport vehicle to transport the article from the transport origin to the transport destination; and
path selection processing for selecting the transport path for the transport vehicle to travel along from among the plurality of candidate paths,
a time range comprising an average transport time is set as a reference range, the average transport time is an average of required transport times for a combination of a plurality of transport origins with respect to a target transport destination, each of the required transport times is a time required to transport the article along a path from one of the plurality of transport origins to one target transport destination, and the target transport destination is a transport destination to be a target out of a plurality of transport destinations specifiable in the transport command, and
the control system preferentially selects a candidate path whose predicted transport time is within the reference range as the transport path in the path selection processing regarding candidate paths with the target transport destination as the transport destination.

2. The article transport facility according to claim 1, wherein the control system is further configured to:
execute correction processing for correcting the predicted transport time of at least either a non-priority candidate path or a priority candidate path such that the priority candidate path is more likely to be selected in the path selection processing than the non-priority candidate path, the priority candidate path being, of the plurality of candidate paths, a candidate path whose predicted transport time is within the reference range, the non-priority candidate path being a candidate path whose predicted transport time is outside the reference range; and
select, in the path selection processing, a candidate path having a shortest predicted transport time after correction by the correction processing as the transport path from among the plurality of candidate paths.

3. The article transport facility according to claim 1, wherein if, in the path selection processing, there are a plurality of the candidate paths whose predicted transport time is within the reference range, the control system selects a candidate path having a shortest predicted transport time as the transport path from among the plurality of candidate paths whose predicted transport time is within the reference range, and
wherein if, in the path selection processing, there is only one candidate path whose predicted transport time is within the reference range, the control system selects this candidate path as the transport path.

4. The article transport facility according to claim 1, wherein if, in the path selection processing, there is no candidate path whose predicted transport time is within the reference range, the control system selects a candidate path whose predicted transport time is closest to the reference range as the transport path.

* * * * *